United States Patent
Bhatia et al.

(10) Patent No.: US 9,519,527 B1
(45) Date of Patent: Dec. 13, 2016

(54) SYSTEM AND METHOD FOR PERFORMING INTERNAL SYSTEM INTERFACE-BASED COMMUNICATIONS IN MANAGEMENT CONTROLLER

(71) Applicant: American Megatrends, Inc., Norcross, GA (US)

(72) Inventors: Anurag Bhatia, Lilburn, GA (US); Samvinesh Christopher, Suwanee, GA (US); Winston Thangapandian, Duluth, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 0 days.

(21) Appl. No.: 14/819,230

(22) Filed: Aug. 5, 2015

(51) Int. Cl.
*G06F 9/54* (2006.01)

(52) U.S. Cl.
CPC ............... *G06F 9/541* (2013.01); *G06F 9/544* (2013.01)

(58) Field of Classification Search
CPC .................................. G06F 9/541; G06F 9/544
See application file for complete search history.

(56) References Cited

U.S. PATENT DOCUMENTS

| | | | | |
|---|---|---|---|---|
| 2008/0278508 A1* | 11/2008 | Anderson | ............. | G06F 3/1462 345/519 |
| 2014/0195704 A1* | 7/2014 | Bhatia | ..................... | G06F 13/42 710/105 |
| 2015/0220411 A1* | 8/2015 | Shivanna | ............ | G06F 11/2289 714/19 |

* cited by examiner

*Primary Examiner* — Syed Roni
(74) *Attorney, Agent, or Firm* — Locke Lord LLP; Tim Tingkang Xia, Esq.

(57) ABSTRACT

Certain aspects direct to systems and methods for performing internal system interface-based communications between Intelligent Platform Management Interface (IPMI) stack and management services in management controllers. The system includes a server management device, which has an IPMI stack and at least one management service module. The management service module, when executed, provides a corresponding management service. In operation, the server management device defines an internal system interface, and configures the internal system interface to establish an inter-process communication (IPC) channel between the IPMI stack and the management service using the internal system interface. Thus, an internal communication between the IPMI stack and the management service may be performed through the IPC channel.

20 Claims, 3 Drawing Sheets

SYSTEM AND METHOD FOR PERFORMING INTERNAL SYSTEM INTERFACE-BASED COMMUNICATIONS IN MANAGEMENT CONTROLLER

FIELD

The present disclosure relates generally to server management technology, and more particularly to systems and methods for performing internal system interface-based communications between Intelligent Platform Management Interface (IPMI) stack and management services in management controllers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Intelligent Platform Management Interface (IPMI) is an industry standard for system monitoring and event recovery. Currently, baseboard management controller (BMC) chips fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer.

Generally, a typical server management controller stack has an IPMI stack running at its core to serve the direct IPMI requests. Meanwhile, the server management controller stack may have additional management services. Practically, there is a need for communication between any of the management services to the IPMI stack within the server management controller stack. However, the IPMI Specification does not define any internal interface to the BMC for the management services to communicate with the IPMI stack.

Therefore, an unaddressed need exists in the art to address the aforementioned deficiencies and inadequacies.

SUMMARY

Certain aspects of the disclosure direct to a system, which includes a server management device. In certain embodiments, the server management device includes a processor and a storage device storing an Intelligent Platform Management Interface (IPMI) stack, at least one management service module, and computer executable code. Each of the at least one management service module, when executed at the processor, is configured to provide a corresponding management service. The computer executable code, when executed at the processor, is configured to: define an internal system interface, and configure the internal system interface to establish an inter-process communication (IPC) channel between the IPMI stack and the management service using the internal system interface; and perform internal communication between the IPMI stack and the management service through the IPC channel.

In certain embodiments, the server management device is a baseboard management controller (BMC).

In certain embodiments, the internal system interface is a Unix domain socket (UDS) or an IPC socket.

In certain embodiments, the management service is a service providing at least one out-of-band (OOB) functionality for the server management device.

In certain embodiments, the management service is a web server service, a keyboard, video and mouse (KVM) service, a Common Information Model (CIM) service, a Systems Management Architecture for Server Hardware (SMASH) service, or a combination thereof.

In certain embodiments, the computer executable code includes: a configuration module configured to define the internal system interface and configure the internal system interface to establish the IPC channel; and an internal communication module configured to perform the internal communication between the IPMI stack and the management service through the IPC channel.

In certain embodiments, the configuration module is configured to configure the internal system interface to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

Certain aspects of the disclosure direct to a method for performing internal system interface-based communications in a server management device. In certain embodiments, the method includes: defining, by the server management device, an internal system interface, and configuring the internal system interface to establish an inter-process communication (IPC) channel between an Intelligent Platform Management Interface (IPMI) stack and at least one management service within the server management device using the internal system interface, wherein the at least one management service is provided by executing at least one management service module in the server management device; and performing, by the server management device, internal communication between the IPMI stack and the at least one management service through the IPC channel.

In certain embodiments, the server management device is a BMC. In certain embodiments, the internal system interface is a UDS or an IPC socket. In certain embodiments, each of the at least one management service is a service providing at least one OOB functionality for the server management device, and wherein the at least one management service is a web server service, a KVM service, a CIM service, a SMASH service, or a combination thereof.

In certain embodiments, the internal system interface is configured to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

Certain aspects of the disclosure direct to a non-transitory computer readable medium storing an IPMI stack, at least one management service module, and computer executable code. In certain embodiments, the code, when executed at a processor of a server management device, is configured to: define an internal system interface, and configure the internal system interface to establish an IPC channel between the IPMI stack and at least one management service within the server management device using the internal system interface, wherein the at least one management service is provided by executing at least one management service module at the processor of the server management device; and perform an internal communication between the IPMI stack and the at least one management service through the IPC channel.

In certain embodiments, the server management device is a BMC. In certain embodiments, the internal system interface is a UDS or an IPC socket. In certain embodiments, each of the at least one management service is a service providing at least one OOB functionality for the server management device, and wherein the at least one management service is a web server service, a KVM service, a CIM service, a SMASH service, or a combination thereof.

In certain embodiments, the computer executable code includes: a configuration module configured to define the internal system interface and configure the internal system interface to establish the IPC channel; and an internal communication module configured to perform the internal communication between the IPMI stack and the management service through the IPC channel.

In certain embodiments, the configuration module is configured to configure the internal system interface to establish IPC channel by referencing the IPC channel with an IPC file, such that the IPC channel is accessible by the IPMI stack and the management service.

In certain embodiments, the IPC channel is accessible by the IPMI stack and the management service as a file system, wherein the file system includes a first file location representing the IPMI stack and a second file location representing the management device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
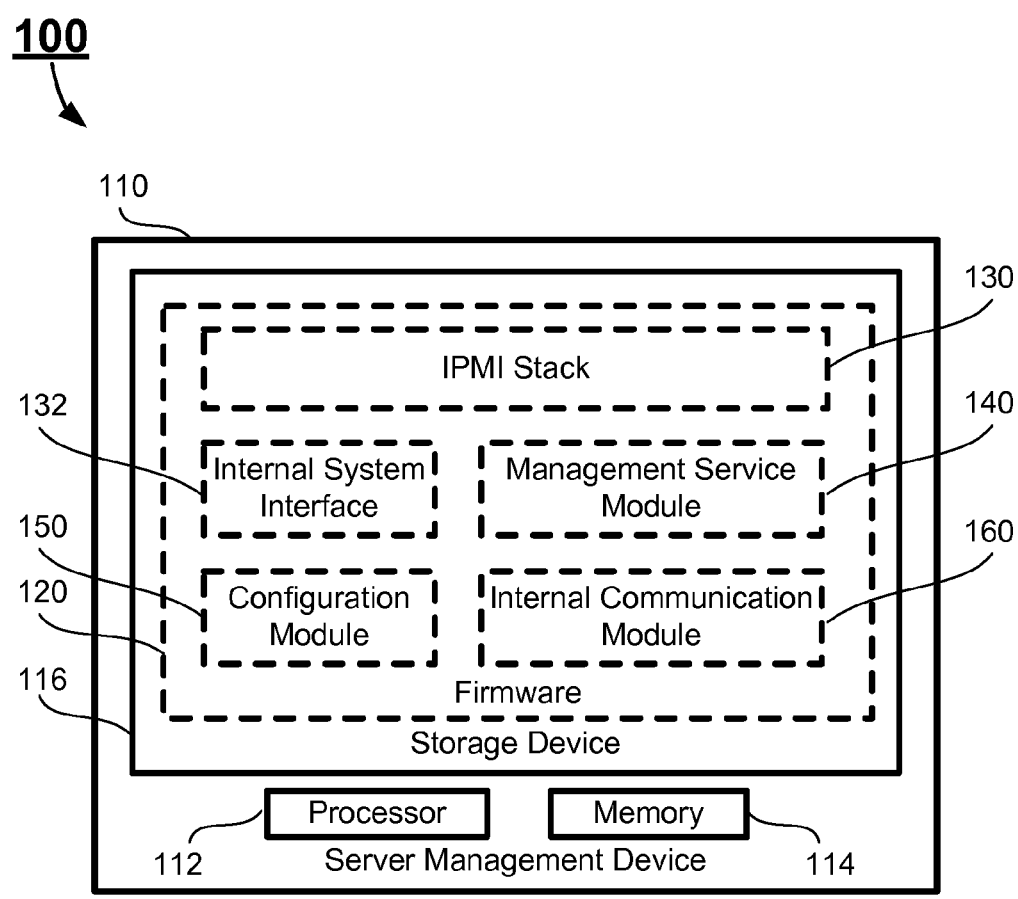
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for performing internal system interface-based communications in a server management device. As discussed above, a typical server management controller stack has an IPMI stack running at its core to serve the direct IPMI requests. The IPMI Specification defines standard BMC in-band interfaces, such as a keyboard controller style (KCS) interface, a block transfer (BT) interface, and a server management interface chip (SMIC), for the host to BMC communications. Further, the IPMI Specification also defines out-of-band (OOB) session based interfaces, such as the local area network (LAN), the Intelligent Platform Management Bus (IPMB) interface, and other serial interface or ports. However, the IPMI Specification does not define any internal interface to the BMC for the management services to communicate with the IPMI stack. Thus, certain embodiments of the present disclosure provide systems and methods to implement a software-implemented internal system interface to fulfill the need for internal communication between the management services and the IPMI stack within the server management controller stack.

FIG. 1 schematically depicts an exemplary system according to certain embodiments of the present disclosure. The system 100 is capable of performing internal system interface-based communications in a server management device. As shown in FIG. 1, the system 100 includes a server management device 110. Although not explicitly shown in FIG. 1, the server management device 110 may be communicatively connected to one or more computing devices (not shown) via a network or any other in-band or OOB interfaces, such as the KCS, BT, SMIC interfaces, the LAN or other serial interfaces. For example, one of the computing devices may function as a host computer of the server management device 110, and other computing devices may function as the servers controlled by the server management device 110. In certain embodiments, the network may be a wired or wireless network, and may be of various forms, such as a public network and a private network. Examples of the network may include, but not limited to, the LAN or a wide area network (WAN) including the Internet. In certain embodiments, two or more different networks and/or interfaces may be applied to connect the server management device 110 to the computing devices.

The server management device 110 is a management controller to control a plurality of servers or services. In certain embodiments, the server management device 110 may be implemented by a system on chip (SoC), such as a BMC or a service processor (SP), or by other management controllers.

In certain embodiments, the server management device 110 may include necessary hardware and software components to perform certain predetermined tasks. For example, as shown in FIG. 1, the server management device 110 includes a processor 112, a memory 114, and a storage device 116. Further, the server management device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is configured to control operation of the server management device 110. In certain embodiments, the processor 112 may be a central processing unit (CPU). The processor 112 can execute any computer executable code or instructions, such as the firmware 120 of the server management device 110 or other applications and instructions of the server management device 110. In certain embodiments, the server management device 110 may run on more than one processor, such as two processors, four processors, eight processors, or any suitable number of processors.

The memory 114 can be a volatile memory, such as the random-access memory (RAM), for storing the data and information during the operation of the v server management device 110. In certain embodiments, the memory 114 may be a volatile memory array.

The storage device 116 is a non-volatile data storage media for storing the applications of the server management device 110. Examples of the storage device 116 may include non-volatile memory such as flash memory, memory cards, USB drives, hard drives, floppy disks, optical drives, or any other types of data storage devices. In certain embodiments, the server management device 110 may have multiple storage devices 116, which may be identical storage devices or different types of storage devices, and the applications may be stored in one or more of the storage devices 116 of the server management device 110.

As shown in FIG. 1, the storage device 116 of the server management device 110 stores a firmware 120, which may include, among other things, an IPMI stack 130, an internal system interface 132, a management service module 140, a configuration module 150, and an internal communication module 160. In certain embodiments, the firmware 120 may store other applications necessary for the operation of the server management device 110. It should be noted that the stacks and modules of the firmware 120 are each implemented by computer executable codes or instructions, which collectively forms the firmware 120. In certain embodiments, each of the stacks and modules may further include sub-stacks or sub-modules. Alternatively, some of the stacks and modules may be combined as one stack.

The IPMI stack 130 provides IPMI functionalities for the server management device 110. For example, the IPMI stack 130 may be used to process an IPMI message. In certain embodiments, the IPMI stack 130 may be in communication with the computing devices through the in-band or OOB functions defined by the IPMI Specification. For example, the IPMI stack 130 may communicate with a host computer through the KCS, BT or SMIC interfaces, or may communicate with a remote computing device through LAN. In certain embodiments, the IPMI stack 130 may communicate with a satellite controller (not shown) through an IPMB interface.

The internal system interface 132 is a software-implemented internal interface implemented by the configuration module 150 and the internal communication module 160 for the purpose of performing an internal communication between the IPMI stack 130 and the management service 140. In other words, the internal system interface 132 is a part of an extension of the IPMI stack 130 to allow the internal communication to the management service 140. In certain embodiments, the internal system interface 132 may be a Unix domain socket (UDS) or an IPC socket.

The UDS or IPC socket is a data communications endpoint for exchanging data between processes executing within the same host operating system. The UDS supports transmission of a reliable stream of bytes (SOCK_STREAM, compare to TCP), and additionally supports ordered and reliable transmission of datagrams (SOCK_SEQPACKET), or unordered and unreliable transmission of the same (SOCK_DGRAM, compare to UDP). The UDS facility is a standard component of POSIX operating systems. The application programming interface (API) for UDS is similar to that of an Internet socket, but rather than using an underlying network protocol, all communication occurs entirely within the operating system kernel. Generally, the UDS uses the file system as its address name space, and may be referenced by processes as an index node (generally referred to as an "inode") in the file system. This allows two processes to open the same socket in order to communicate.

The management service module 140 is a module which, when executed at the processor 112, is configured to provide a corresponding management service instance (hereinafter the management service). In certain embodiments, a management service is generally a service not provided by the IPMI stack 130 and not covered or defined by the IPMI Specification. In other words, the management service may be a non-IPMI service. In certain embodiments, the management service provides one or more OOB functionalities for the server management device 110 since it is not covered by IPMI and may operate independently from the operation of the IPMI stack 130. Examples of the management service may include, without being limited to, a web server service, a keyboard, video and mouse (KVM) service, a Common Information Model (CIM) service, a Systems Management Architecture for Server Hardware (SMASH) service. In certain embodiments, the firmware 120 may include multiple management service modules 140, and each of the management service modules 140, when executed, may provide a corresponding management service, and all the management services provided in one server management device 110 may be independent and different from one another. For example, the web server, KVM, CIM and SMASH services may all be provided in one single server management device 110 at the same time.

The configuration module 150 and the internal communication module 160 are extensions of the IPMI stack 130 to implement the internal communication between the IPMI stack and the management service. Specifically, the configuration module 150 is configured to define the internal system interface 132, and configure the internal system interface 132 to establish an IPC channel, which is a bi-directional channel, between the IPMI stack 130 and the management service using the internal system interface 132. In certain embodiments, the configuration module 150 may include an IPC file which contains the information for configuring the internal system interface to establish the IPC channel. In operation, the configuration module 150 may establish the IPC channel by referencing with the IPC file, such that the IPC channel is accessible by the IPMI stack 130 and the management service. For example, when the internal system interface 132 is the UDS, the UDS may use the file system as its address name space, and may be referenced by processes as an inode in the file system. Thus, when the configuration module 150 establishes the IPC channel, the configuration module 150 refer to the IPC file such that the IPC channel is accessible by the IPMI stack 130 and the management service as a file system, which may include a first file location representing the IPMI stack 130 and a second file location representing the management device. Thus, the internal communication between the IPMI stack 130 and the management service may be established within the server management device 110.

The internal communication module 160 is configured to perform an internal communication between the IPMI stack and the management service through the IPC channel. In certain embodiments, when the management service sends data directed to the IPMI stack 130 through the IPC channel, the internal communication module 160 receives the data, and forwards the data to the IPMI stack 130. Further, when the IPMI stack 130 sends a response to the data sent by the management service, the internal communication module 160 receives the response, and forwards the response to the management service.

Figure 2:
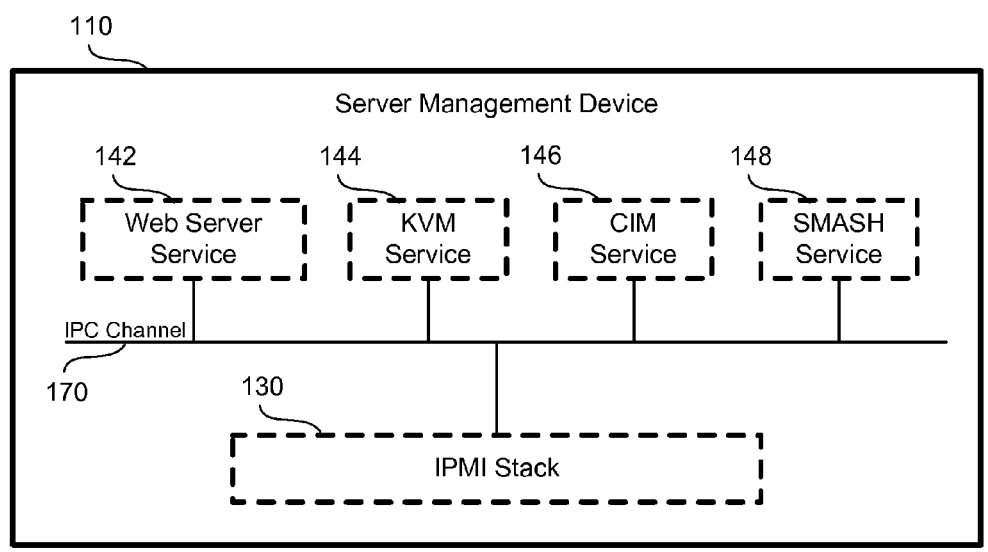
FIG. 2 schematically depicts an internal communication between the IPMI stack and the management services according to certain embodiments of the present disclosure.

FIG. 2 schematically depicts an internal communication between the IPMI stack and the management services according to certain embodiments of the present disclosure. As shown in FIG. 2, the server management device 110 provides multiple management services, including the web server service 142, the KVM service 144, the CIM service 146 and the SMASH service 148. As disclosed above, the configuration module 150 may define the internal system interface 132 (such as the UDS or IPC socket), and then establish the IPC channel 170 using the internal system interface 132, thus enabling the internal communication between the IPMI stack 130 and the management services. All the management services, including the web server service 142, the KVM service 144, the CIM service 146 and the SMASH service 148, or any other management services provided by the same server management device 110, may communicate with the IPMI stack 130 through the IPC channel 170 with the help of the internal system interface 132.

For example, the web server service 142 may contain a web page for displaying information of the IPMI stack 130. To obtain the information of the IPMI stack 130, the web server service 142 must send a request command to the IPMI stack 130 through the IPC channel 170 to retrieve the information. Once the internal communication module 160 receives the request command, the internal communication module 160 forwards the request command to the IPMI stack 130. The IPMI stack 130 then retrieves the information being requested based on the request command, and sends the information to the web server service 142 through the IPC channel 170. The internal communication module 160 receives the information, and then forwards the information to the web server service 142. Thus, the web server service 142 may have the necessary information to be displayed on the web page.

A further aspect of the present disclosure is directed to a method for performing internal system interface-based communications in a server management device. In certain embodiments, the method may be implemented on a system as shown in FIG. 1.

Figure 3:
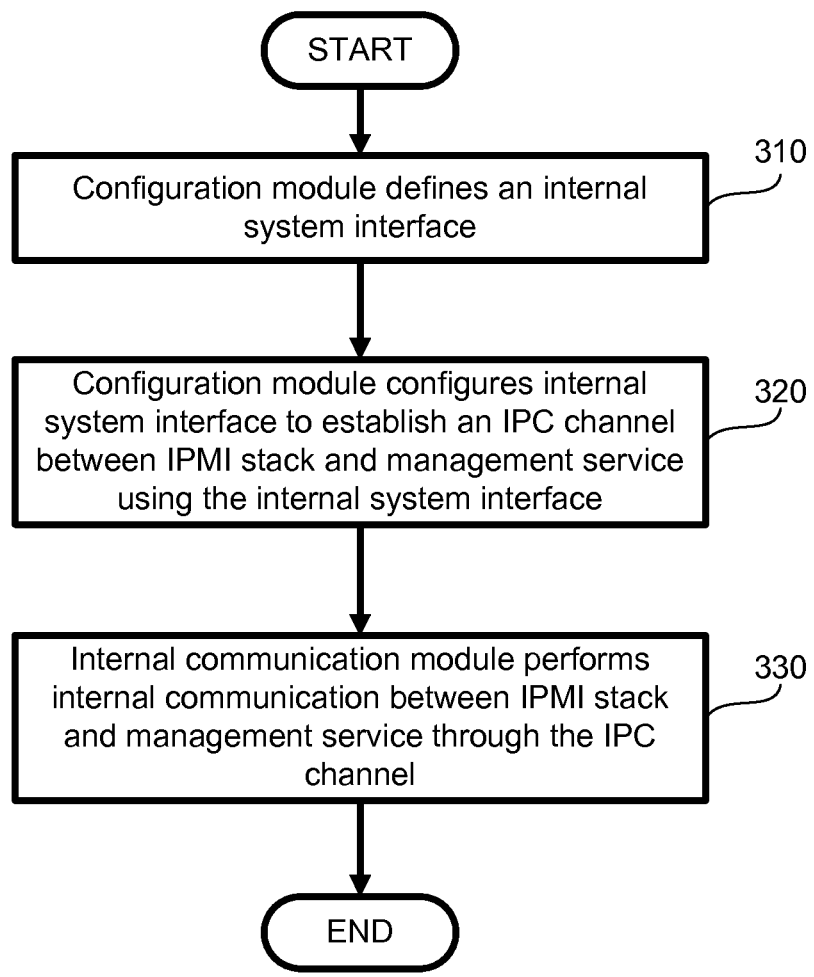
FIG. 3 depicts a flowchart showing a method for performing internal system interface-based communications in a server management device according to certain embodiments of the present disclosure.

FIG. 3 depicts a flowchart showing a method for performing internal system interface-based communications in a server management device according to certain embodiments of the present disclosure. In this embodiment, only one management service is provided by the server management device to communicate with the IPMI stack. When the server management device provides multiple management services may perform internal system interface-based communications with the IPMI stack.

At procedure 310, the configuration module 150 defines an internal system interface 132, such as a UDS or IPC socket. At procedure 320, the configuration module 150 configures the internal system interface 132 to establish an IPC channel 170 between the IPMI stack 130 and the management service using the internal system interface 132. Thus, at procedure 330, the internal communication module 330 may be capable of performing the internal communication between the IPMI stack 130 and the management service through the IPC channel 170.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 116 of the server management device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a server management device, comprising a processor and a storage device storing an Intelligent Platform Management Interface (IPMI) stack, at least one non-IPMI management service module, and computer executable code, wherein each of the at least one non-IPMI management service module, when executed at the processor, is configured to provide a corresponding non-IPMI management service;
wherein the computer executable code, when executed at the processor, is configured to:
define an internal system interface, and configure the internal system interface to establish an inter-process communication (IPC) channel between the IPMI stack and the non-IPMI management service using the internal system interface; and
perform an internal communication between the IPMI stack and the non-IPMI management service through the IPC channel.

2. The system as claimed in claim 1, wherein the server management device is a baseboard management controller (BMC).

3. The system as claimed in claim 1, wherein the internal system interface is an IPC socket.

4. The system as claimed in claim 1, wherein the non-IPMI management service is a service providing at least one out-of-band (OOB) functionality for the server management device.

5. The system as claimed in claim 4, wherein the non-IPMI management service is a web server service, a keyboard, video and mouse (KVM) service, a Common Information Model (CIM) service, a Systems Management Architecture for Server Hardware (SMASH) service, or a combination thereof.

6. The system as claimed in claim 1, wherein the computer executable code comprises:
a configuration module configured to define the internal system interface and configure the internal system interface to establish the IPC channel; and
an internal communication module configured to perform the internal communication between the IPMI stack and the non-IPMI management service through the IPC channel.

7. The system as claimed in claim 6, wherein the configuration module is configured to configure the internal system interface to establish IPC channel by referencing the IPC channel with an IPC file, such that the IPC channel is accessible by the IPMI stack and the non-IPMI management service.

8. The system as claimed in claim 7, wherein the IPC channel is accessible by the IPMI stack and the non-IPMI management service as a file system, wherein the file system includes a first file location representing the IPMI stack and a second file location representing the management device.

9. A method for performing internal system interface-based communications in a server management device, the method comprising:
defining, by the server management device, an internal system interface, and configuring the internal system interface to establish an inter-process communication (IPC) channel between an Intelligent Platform Management Interface (IPMI) stack and at least one non-IPMI management service within the server management device using the internal system interface, wherein the at least one non-IPMI management service is provided by executing at least one non-IPMI management service module in the server management device; and performing, by the server management device, an internal communication between the IPMI stack and the at least one non-IPMI management service through the IPC channel.

10. The method as claimed in claim 9, wherein the server management device is a baseboard management controller (BMC).

11. The method as claimed in claim 9, wherein the internal system interface is an IPC socket.

12. The method as claimed in claim 9, wherein each of the at least one non-IPMI management service is a service providing at least one out-of-band (OOB) functionality for the server management device, and wherein the at least one non-IPMI management service is a web server service, a keyboard, video and mouse (KVM) service, a Common Information Model (CIM) service, a Systems Management Architecture for Server Hardware (SMASH) service, or a combination thereof.

13. The method as claimed in claim 9, wherein the internal system interface is configured to establish IPC channel by referencing the IPC channel with an IPC file, such that the IPC channel is accessible by the IPMI stack and the non-IPMI management service.

14. The method as claimed in claim 13, wherein the IPC channel is accessible by the IPMI stack and the non-IPMI management service as a file system, wherein the file system includes a first file location representing the IPMI stack and a second file location representing the management device.

15. A non-transitory computer readable medium storing an Intelligent Platform Management Interface (IPMI) stack, at least one non-IPMI management service module, and computer executable code, wherein the computer executable code, when executed at a processor of a server management device, is configured to:

define an internal system interface, and configure the internal system interface to establish an inter-process communication (IPC) channel between the IPMI stack and at least one non-IPMI management service within the server management device using the internal system interface, wherein the at least one non-IPMI management service is provided by executing at least one non-IPMI management service module at the processor of the server management device; and perform an internal communication between the IPMI stack and the at least one non-IPMI management service through the IPC channel.

16. The non-transitory computer readable medium as claimed in claim 15, wherein the server management device is a baseboard management controller (BMC), and the internal system interface is an IPC socket.

17. The non-transitory computer readable medium as claimed in claim 15, wherein each of the at least one non-IPMI management service is a service providing at least one out-of-band (OOB) functionality for the server management device, and wherein the at least one non-IPMI management service is a web server service, a keyboard, video and mouse (KVM) service, a Common Information Model (CIM) service, a Systems Management Architecture for Server Hardware (SMASH) service, or a combination thereof.

18. The non-transitory computer readable medium as claimed in claim 15, wherein the computer executable code comprises:

a configuration module configured to define the internal system interface and configure the internal system interface to establish the IPC channel; and an internal communication module configured to perform the internal communication between the IPMI stack and the non-IPMI management service through the IPC channel.

19. The non-transitory computer readable medium as claimed in claim 18, wherein the configuration module is configured to configure the internal system interface to establish IPC channel by referencing the IPC channel with an IPC file, such that the IPC channel is accessible by the IPMI stack and the non-IPMI management service.

20. The non-transitory computer readable medium as claimed in claim 19, wherein the IPC channel is accessible by the IPMI stack and the non-IPMI management service as a file system, wherein the file system includes a first file location representing the IPMI stack and a second file location representing the management device.

\* \* \* \* \*